(12) United States Patent
Khalaf et al.

(10) Patent No.: US 9,022,135 B2
(45) Date of Patent: May 5, 2015

(54) TORQUE-APPLYING TOOL AND TORQUE CONTROLLER THEREFOR

(71) Applicants: Zuher Naim Khalaf, Troy, MI (US); William Lloyd Naumann, Munson, OH (US)

(72) Inventors: Zuher Naim Khalaf, Troy, MI (US); William Lloyd Naumann, Munson, OH (US)

(73) Assignee: Stanley Black & Decker, Inc., New Britain, CT (US)

( * ) Notice: Subject to any disclaimer, the term of this patent is extended or adjusted under 35 U.S.C. 154(b) by 309 days.

(21) Appl. No.: 13/633,639

(22) Filed: Oct. 2, 2012

(65) Prior Publication Data

US 2014/0090224 A1    Apr. 3, 2014

(51) Int. Cl.
*E21B 7/00* (2006.01)
*G05D 17/02* (2006.01)

(52) U.S. Cl.
CPC ........... *G05D 17/02* (2013.01); *Y10T 29/49766* (2013.01)

(58) Field of Classification Search
USPC ........ 173/1, 2, 176, 180, 181, 93.5, 217, 183; 73/862.21, 862.23; 29/407.01, 407.02, 29/407.03
See application file for complete search history.

(56) References Cited

U.S. PATENT DOCUMENTS

| | | | | |
|---|---|---|---|---|
| 4,344,216 | A | * | 8/1982 | Finkelston ................ 29/407.03 |
| 4,894,767 | A | * | 1/1990 | Doniwa ........................ 700/33 |
| 4,987,669 | A | * | 1/1991 | Makimae et al. .......... 29/407.03 |
| 4,995,145 | A | * | 2/1991 | Eshghy ..................... 29/407.03 |
| 5,215,270 | A | | 6/1993 | Udocon et al. |
| 5,284,217 | A | * | 2/1994 | Eshghy ........................ 173/176 |
| 5,315,501 | A | | 5/1994 | Whitehouse |
| 5,519,614 | A | | 5/1996 | Miichi et al. |
| 5,563,482 | A | * | 10/1996 | Shaw et al. .................... 318/272 |
| 5,637,968 | A | | 6/1997 | Kainec et al. |
| 5,650,574 | A | | 7/1997 | Sato et al. |
| 5,715,894 | A | * | 2/1998 | Maruyama et al. ........... 173/180 |
| 6,430,463 | B1 | * | 8/2002 | Lysaght ....................... 700/168 |
| 6,516,896 | B1 | | 2/2003 | Bookshar et al. |
| 6,539,603 | B1 | * | 4/2003 | Bulow ....................... 29/407.01 |
| 6,783,591 | B1 | * | 8/2004 | Halliyal et al. ................ 117/89 |
| 7,464,769 | B2 | * | 12/2008 | Nakazawa et al. ............ 173/176 |
| 7,467,669 | B2 | * | 12/2008 | Friberg et al. ..................... 173/1 |

* cited by examiner

*Primary Examiner* — Scott A. Smith
(74) *Attorney, Agent, or Firm* — Pillsbury Winthrop Shaw Pittman LLP

(57) ABSTRACT

A torque applying system includes a torque applying tool having a motor and rotating output spindle, a torque sensor that measures an instantaneous torque exerted by the output spindle during a fastening cycle, and a controller operatively connected to the tool to control the tool's rotational speed during the fastening cycle. The controller is programmed to control the tool's rotational speed to be $[(\tau_F - \tau_C)/t]/r$, wherein t is a time constant of speed control, $\tau_F$ is a target final torque for the fastening cycle, and r is a torque rate.

17 Claims, 3 Drawing Sheets

TORQUE-APPLYING TOOL AND TORQUE CONTROLLER THEREFOR

BACKGROUND OF THE INVENTION

1. Field of the Invention

This invention relates to powered torque-applying tools, and more specifically, to control methods for such power tools.

2. Description of Related Art

Computer-controlled, torque-applying power tools (e.g., fluid or electric powered tools) are typically used in production environments to secure threaded fasteners (e.g., nuts and bolts) into joints. Such power tools are typically coupled to a controller. The tool usually has a high-speed, high-torque motor coupled to a universal adapter head. Various interchangeable bits (e.g., bits appropriate for hex-head bolts and hexagonal nuts) are connected to the head in order to drive threaded fasteners.

The controller controls the power supply (e.g. fluid or electricity) for each handheld unit, and also monitors such parameters as the instantaneous tool speed and instantaneous applied torque. In a typical fastening job, fasteners are tightened to a predetermined, specified torque. As the handheld units operate at high speed, on the order of several hundred RPM or higher, the controller is typically used to control and stop the motor of the tool automatically so that the torque applied to the fastener and joint does not exceed the specified torque. A fastening cycle is initiated by the user's activation of an ON switch in the case of a hand-held tool, or by the controller in the case of a robotic tool. However, in view of the high speed of the tool, overshoot (exceeding the intended torque) is a common problem.

U.S. Pat. Nos. 5,215,270, 5,315,501, 5,519,614, 5,637, 968, 5,650,574, and 6,516,896 disclose various conventional fastening tool controllers designed to control a tool's torque while avoiding overshoot.

SUMMARY OF EMBODIMENTS OF THE INVENTION

There is a need in the art for a tool torque controller that reduces cycle time without compromising torque accuracy.

One or more embodiments of the present invention provide a torque-controlling algorithm for a controller for a torque applying tool. The controller's algorithm accounts for the kinetic energy of the rotating spindle of the tool and/or a responsiveness of the tool to desired changes in rotational speed so as to provide a fast fastening cycle time while avoiding overshoot. Moreover, a shorter cycle time may result in reduced adverse heating of the tool during repeated fastening cycles.

According to one or more embodiments, the algorithm accounts for tool parameters such as the tool's time constant of speed control.

According to one or more embodiments, the algorithm provides fast cycle times for both soft and hard joints without retuning the controller when changing between different joints (e.g., from a fastening cycle for a soft joint to a fastening cycle for a hard joint or vice-versa).

One or more embodiments of the present invention provide a method of controlling a torque applying tool to apply a target final torque ($\tau_F$) to a spindle of the tool. The method includes: running the torque applying tool during a fastening cycle; sensing an instantaneous torque ($\tau_C$) being applied by the torque applying tool; and responsively controlling a rotational speed of the tool so as to be $[(\tau_F-\tau_C)/t]/r$ during at least a portion of the fastening cycle, wherein t comprises a time constant of speed control, and r comprises a torque rate.

According to one or more of these embodiments, the method comprises repeating said sensing and said controlling at a predetermined frequency.

According to one or more of these embodiments, the predetermined frequency comprises at least 100 Hz.

According to one or more of these embodiments, the method also includes controlling the rotational speed of the tool to be a rated speed of the torque applying tool when $[(\tau_F-\tau_C)/t]/r$ is greater than the rated speed.

According to one or more of these embodiments, the method also includes controlling the rotational speed of the tool to be a predetermined minimum speed ($\omega_{min}$) when $\omega_{min} > [(\tau_F-\tau_C)/t]/r > 0$.

According to one or more of these embodiments, the method also includes sensing a rotational angle of the spindle; and calculating the torque rate (r) during the fastening cycle as a ratio of change to the sensed torque per change to the sensed rotational angle.

According to one or more of these embodiments, the time constant of speed control (t) comprises a constant that was obtained before the fastening cycle.

One or more embodiments of the present invention provide a combination comprising: a torque applying tool having a motor and rotating output spindle; a torque sensor that measures an instantaneous torque ($\tau_C$) exerted by the output spindle during a fastening cycle; and a controller operatively connected to the torque sensor and tool to control the tool's rotational speed during the fastening cycle. The controller is programmed to control the tool's rotational speed to be $[(\tau_F-\tau_C)/t]/r$ during at least a portion of the fastening cycle, wherein t comprises a time constant of speed control, $\tau_F$ comprises a target final torque for the fastening cycle, and r comprises a torque rate.

According to one or more of these embodiments, the controller is programmed to adjust the speed of the tool at a predetermined frequency.

According to one or more of these embodiments, the predetermined frequency is at least 100 Hz.

According to one or more of these embodiments, the controller is programmed to control the rotational speed of the tool to be a rated speed of the torque applying tool when $[(\tau_F-\tau_C)/t]/r$ is greater than the rated speed.

According to one or more of these embodiments, the controller is programmed to control the rotational speed of the tool to be a predetermined minimum speed ($\omega_{min}$) when $\omega_{min} > [(\tau_F-\tau_C)/t]/r > 0$.

According to one or more of these embodiments, the combination also includes a rotational angle sensor configured to sense a rotational angle of the spindle. The controller is programmed to calculate the torque rate (r) during the fastening cycle as a ratio of change to the sensed torque per change to the sensed rotational angle.

According to one or more of these embodiments, the controller is programmed to adjust the speed of the tool at a predetermined frequency, the adjusting being based on changes to the calculated torque rate during the fastening cycle.

According to one or more of these embodiments, the controller is programmed to use as the time constant of speed control a constant that was known by the controller prior to the fastening cycle.

One or more embodiments provides a controller for a torque applying tool having a motor and a rotating output spindle. The controller is configured to operatively connect to the tool and to a torque sensor that measures an instantaneous torque ($\tau_C$) exerted by the output spindle during a fastening cycle. The controller is configured to control the tool's rotational speed during the fastening cycle. The controller is programmed to control the tool's rotational speed to be $[(\tau_F-\tau_C)/t]/r$, wherein t comprises a time constant of speed control, $\tau_F$ comprises a target final torque for the fastening cycle, and r comprises a torque rate.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

Figure 1:
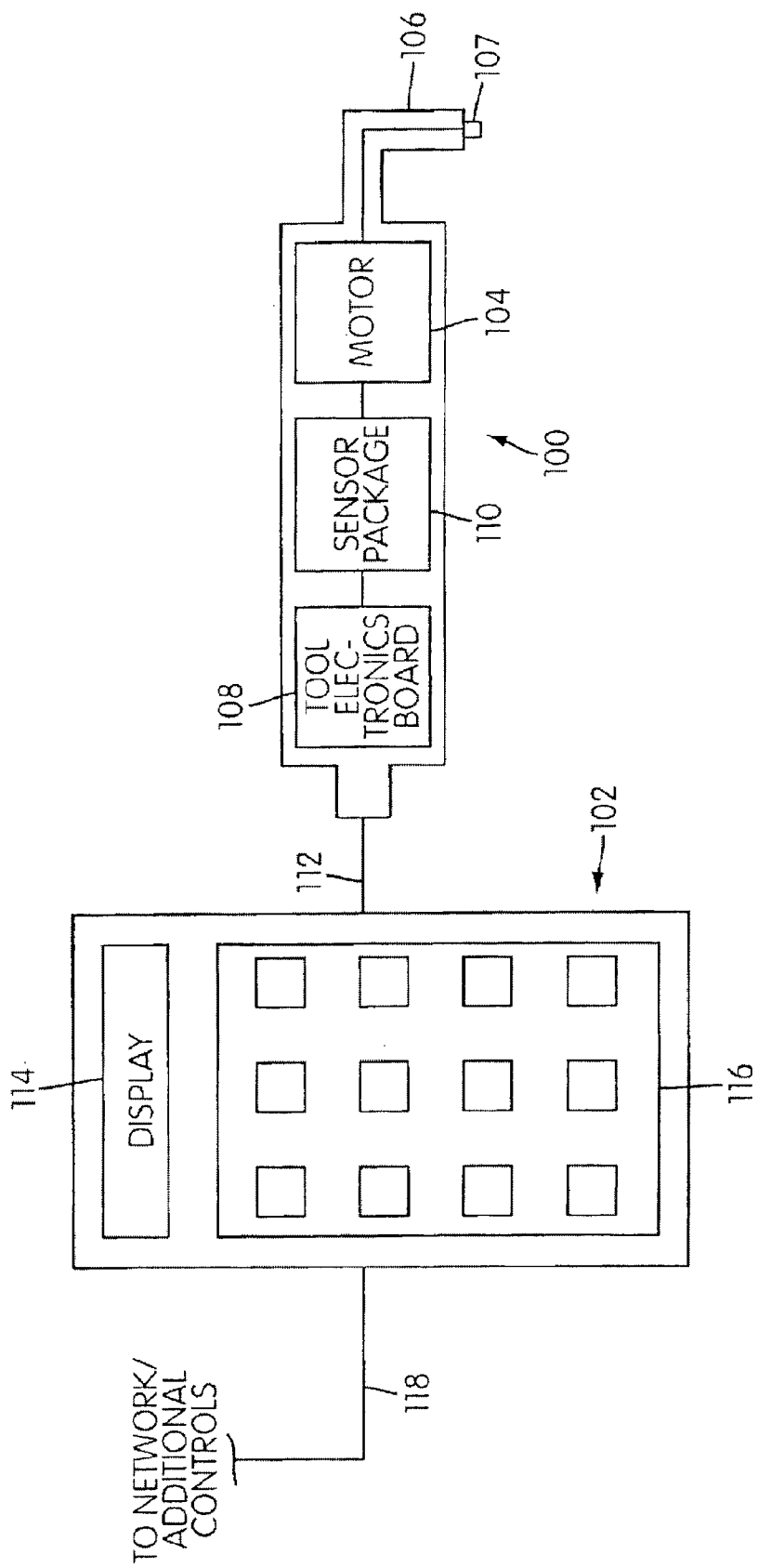
FIG. 1 is a diagrammatic view of a torque-applying tool and controller according to an embodiment of the present invention.

FIG. 1 illustrates an exemplary torque-applying tool 100 and controller 102 (together a torque applying system) according to one or more embodiments of the present invention. The tool 100 includes a high speed electric motor 104 coupled to a drive head 106. The drive head 106 includes a rotatably driven spindle 107 that accepts interchangeable threaded fastener engaging members, such as sockets, allowing the tool 100 to drive a variety of threaded fasteners or other rotatably tightened structures. The tool 100 also includes a tool electronics board (TEB) 108 that interfaces electronically with the controller 102, and a sensor package 110 that communicates with the controller 102. The torque and speed rating of the motor 104 of the torque-applying tool 100 are stored in the tool electronics board 108 (or may be stored or input into the controller 102, or provided via a network 118). A tool without a tool electronics board 108 may be used in the present invention, for example if the tool parameters are entered into the controller 102 by a user, or through other means (e.g., via the network 118).

The sensor package 110 includes a torque sensor, an angle sensor, and a speed sensor that measure the torque applied by the tool 100, a rotational angle of the spindle 107, and the speed at which the tool 100 is operating, respectively. However, one or more of these sensors may be omitted from the sensor package 110 without deviating from the scope of the invention. The sensor package 110 may be integral to the motor 104. For example, the motor 104 may be a brushless DC servo motor with an internal angular sensor that determines the position of the armature relative to the stator windings. Such a sensor may also be used to determine if an error condition exists during tightening. Alternatively, the angle sensor could comprise an angular encoder (e.g., an optical sensor) or a linear hall sensor.

Although the torque-applying tool has thus far been described with respect to a tool including an electric motor 104, it should be understood that the present invention may be applied to a number of different types of computer-controlled torque-applying tools, of which tool 100 is only one example. In particular, embodiments of the present invention may also be applied to computer-controlled fluid powered tools, such as pneumatic and hydraulic tools. It should also be understood that the tool 100 need not be a handheld tool. Rather, a tool 100 could be mounted in a permanent, articulating fixture and controlled remotely or robotically. Such a mounted tool 100 would be especially applicable to an industrial assembly line environment, in which it might be programmed to activate when a part reaches a predetermined location in the assembly line.

The controller 102 provides a user-programmable interface for the tool 100, communicating with the tool electronics board 108 through connector 112. The controller 102 has a display 114, for example an LED display, and an input panel 116. The input panel 116 allows a user to input process parameters for a specific fastening job into the controller 102, such as a programmed target torque and a programmed free/rated speed. The controller 102 may also be provided with a network interface 118. The network interface 118 connects the controller 102 to an external computer, such as a personal computer, so that the programmed target torque and the programmed free speed, among other things, can be input remotely. The network interface 118 may also allow a number of controllers 102 and tools 100 to be programmed and monitored remotely by a single user at a single computer. A user may program the controller 102 either from the input panel 116 or from an external computer connected to the network interface 118 with the same results.

It should also be understood that although the controller 102 in this embodiment is implemented as a specialized computer system with its own microprocessor, memory, display 114, and input panel 116, the controller 102 may be a general purpose computer or any other computing system (e.g., a tablet, a laptop, a smartphone, a handheld computing device, etc.) capable of implementing the control algorithm(s) discussed below.

It should also be appreciated that the controller 102 (or some of the controller 102's components) may be integrated into the tool 100, rather than provided in a separate housing as illustrated in FIG. 1. For example, the input panel 116 and display 114 could wirelessly connect to the tool 100 or another portion of the controller 102. For example, the input panel 116 and display 114 could be comprised of a portable computer, tablet, smartphone, or other similar device that connects to the tool 100 or other parts of the controller 102 either wirelessly (e.g., Bluetooth, WIFI, IR, etc.) or via a wired connection (e.g. Ethernet, serial, USB, etc.) or other type of data connection.

The controller 102 monitors the torque, angle, and/or the speed of the tool 100 during fastening operations and adjusts the speed of the tool 100 appropriately to prevent torque overshoot. In particular, the controller 102 is designed to account for kinetic energy of the rotating motor 104, drive head 106, and spindle 107 and adjust the speed of the tool 100 so that the kinetic energy does not cause overshoot. According to various embodiments, the controller 102 uses the following algorithm to determine an instantaneous desired rotational speed ($\omega$) of the tool 100 and maintain an acceptable level of kinetic energy:

$$\omega_{desired} = (\tau/t)/r$$

where
- $\omega_{desired}$ = desired tool 100 rotational speed that the controller 102 instructs the tool 100 to run at (degrees/msec)=
- $\tau$ = target final torque ($\tau_F$)−instantaneous torque ($\tau_C$)(Nm)
- t = time constant of speed control (msec.)
- r = torque rate (Nm/degree)

The controller 102 causes tool 100 to run at $\omega_{desired}$.

FIGS. 2A-2E illustrate exemplary speed v. angle (FIG. 2A), torque v. angle (FIG. 2B), speed v. time (FIG. 2C), torque v. time (FIG. 2D), and speed v. torque (FIG. 2E) charts for a fastening cycle controlled using the controller 102 according to an embodiment of the present invention.

The target final torque ($\tau_F$) can be a user-input target torque that a user input into the controller 102. Alternatively, the target final torque ($\tau_F$) may be provided via any other suitable mechanism (e.g., via the network interface 118). In the embodiment illustrated in FIGS. 2A-2F, the target final torque is 25 Nm.

The instantaneous torque ($\tau_C$) is measured via a torque sensor of the sensor package 110 and may be determined by the controller 102. The torque sensor may use any suitable mechanism for calculating the instantaneous torque being applied by the tool 100 (e.g., a strain gauge on a structure across which the torque is transmitted, analysis of the electrical load on the motor 104).

The time constant (t) is a function of the responsiveness of the tool 100 to changes in desired speed (also known as an inverse of a speed bandwidth (Hz) of the tool 100). According to various non-limiting embodiments, the time constant (t) depends on the motor 104, the mass of moving parts of the motor 104 such as the spindle 107, etc. The time constant (t) can be determined empirically and may be optimized to balance the competing desires to (1) shorten fastening cycle time and (2) avoid overshoot. Additionally and/or alternatively, the time constant (t) may be determined using any suitable empirical, theoretical, mathematical, or other mechanism without deviating from the scope of the present invention. The time constant (t) is a constant that is preferably determined before a fastening cycle starts.

In the embodiment illustrated in FIGS. 2A-2E, the time constant (t) is 2.5 ms.

The torque rate (r) refers to a change in torque per change in fastener rotational angle, and is dependent upon the joint being created. A soft joint has a lower torque rate than a hard joint. The torque rate (r) may be determined prior to or during each fastening cycle. For a known type of fastening cycle, the torque rate (r) may be empirically derived from one or more fastening cycles. Such empirical data may be combined with fastening cycle data for each new comparable fastening cycle so as to update/improve the torque rate (r) with each new cycle.

Alternatively, the torque rate (r) may be calculated during an early torque period within each fastening cycle either (1) before the torque control algorithm is used (e.g., during an initial period in which the tool 100 is operated at its full rated speed), (2) or during an initial period within the fastening cycle when a previously determined initial torque rate is used by the algorithm before the torque rate is updated during the present fastening cycle. For example, torque and angle measurements may be taken at two early torque points (e.g., 5% and 30% of target torque), and the torque rate (r) is then calculated as being the increase in torque divided by change in angle between those two torque points. The calculated torque rate (r) can thereafter be used for the remainder of the fastening cycle.

Figure 2A:
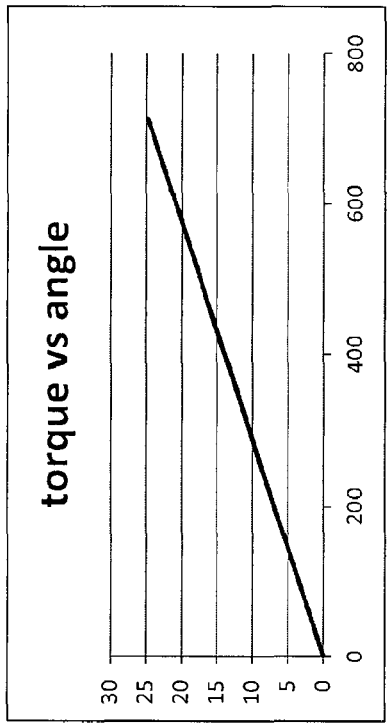
FIGS. 2A-E are charts of the various parameters associated with a torque control algorithm used by the controller of FIG. 1 according to various embodiments of the invention.
Figure 2B:
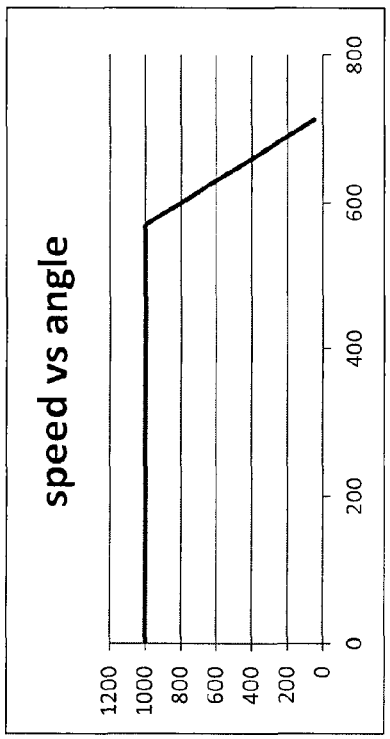

Alternatively, the torque rate (r) may be instantaneously calculated throughout or during a predetermined portion of each fastening cycle. For example, the torque rate (r) may be calculated by a least squares method to determine the instantaneous slope of the torque v. angle chart, e.g., as shown in FIG. 2B. For the example embodiment illustrated in FIG. 2B, the torque rate (r) is about 0.0347 Nm/degree for the example joint being formed.

According to various embodiments, the speed controlling algorithm of the controller 102 is only used when the desired speed falls below the rated/free speed ($\omega_{max}$) for the tool 100. In such an embodiment:

$$\omega_{desired} = \min[(\tau/t)/r, \omega_{max}]$$

Figure 2C:
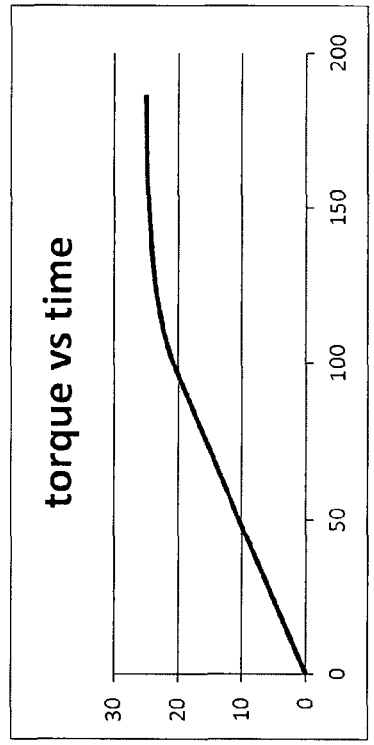
Figure 2D:
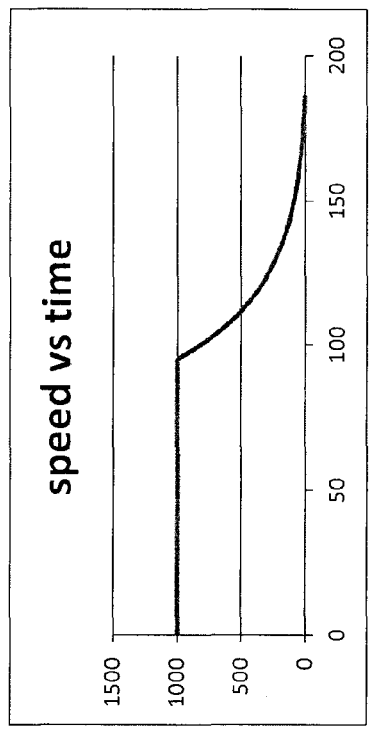
Figure 2E:
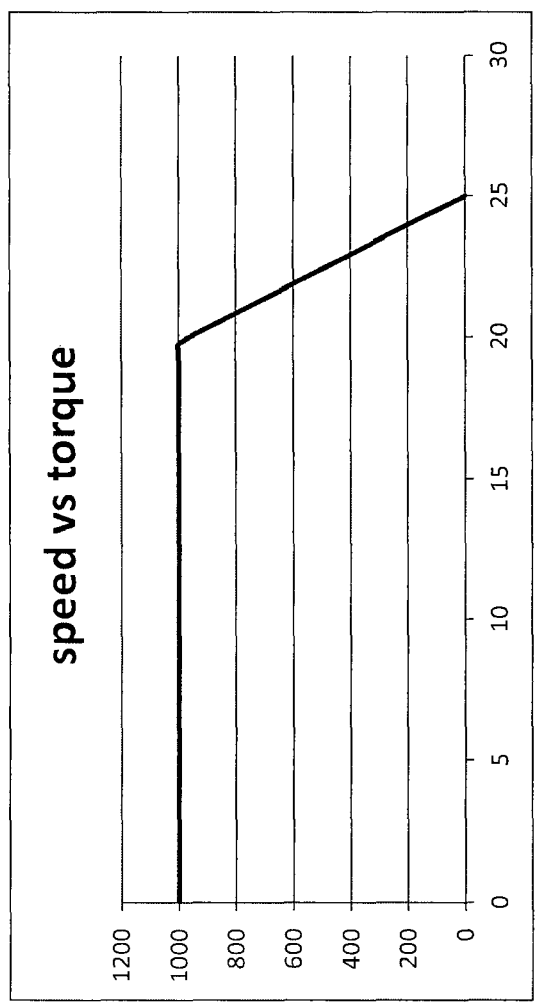

As a result, in a fastening cycle, the controller 102 will typically run the tool 100 at its rated speed ($\omega_{max}$) until ($\tau/t$)/r falls below $\omega_{max}$, after which $\omega_{desired}$ will equal ($\tau/t$)/r. As shown in FIGS. 2A, 2C and 2E, in an embodiment in which the rated speed ($\omega_{max}$) is 1000 rpm (6 degrees/ms), the controller 102 runs the tool 100 at the motor 104's rated speed ($\omega_{max}$) for about the first 95 ms, 575 degrees, and 20 Nm of the fastening cycle, after which the calculated ($\tau/t$)/r falls below 100 rpm (6 degrees/ms).

According to various embodiments, the speed controlling algorithm of the controller 102 may always keep the desired speed above a minimum speed ($\omega_{min}$) of the tool 100 during operation of the tool 100. In such an embodiment, the controller 102 incorporates into the algorithm that:

$$\omega_{desired} = \omega_{min} \text{ if } \omega_{min} > (\tau/t)/r > 0$$

$\omega_{desired}$ therefore drops from to 0 when $\tau$=0 (i.e., when target final torque ($\tau_F$)=instantaneous torque ($\tau_C$)). According to various embodiments, $\omega_{min}$ may be a predetermined percentage of the tool 100's rated speed $\omega_{max}$ (e.g., 1, 2, 3, 4, 5, 6, 7, 8, 9, and/or 10% of $\omega_{max}$, less than 20, 15, 12.5, 10, 7.5, and/or 5% of $\omega_{max}$, and/or greater than 1, 2, 3, 4, 5, 6, 7, 8, 9, 10, 12.5, and/or 15% of $\omega_{max}$).

When the maximum free speed and minimum speed are both incorporated into the algorithm, the algorithm is:

$$\omega_{desired} = \omega_{max} \text{ if } (\tau/t)/r > \omega_{max}$$

$$\omega_{desired} = (\tau/t)/r \text{ if } \omega_{max} > (\tau/t)/r > \omega_{min}$$

$$\omega_{desired} = \omega_{min} \text{ if } \omega_{min} > (\tau/t)/r > 0$$

$$\omega_{desired} = 0 \text{ if } (\tau/t)/r \leq 0$$

According to one or more embodiments, the controller 102 performs the above calculation and modifies the tool 100's desired rotational speed at a predetermined frequency, which may be at least 10, 100, 500 and/or 1000 Hz (i.e., at less than 100, 10, and/or 1 ms intervals). According to one embodiment, the controller 102 operates at 1000 Hz. The controller 102 actively adjusts the speed of the tool 100 while the tool 100 is on. According to various embodiments, the controller 102's active control over the speed of the motor 100 minimizes torque overshoot while maintaining a fast time-to-torque (i.e., cycle speed).

The foregoing illustrated embodiments are provided to illustrate the structural and functional principles of embodiments of the present invention and are not intended to be limiting. To the contrary, the principles of the present inven-

What is claimed is:

1. A method of using a combination, the combination comprising:
   a torque applying tool having a motor and rotating output spindle;
   a torque sensor that measures an instantaneous torque ($\tau_C$) exerted by the output spindle during a fastening cycle; and
   a controller operatively connected to the torque sensor and tool to control the tool's rotational speed during the fastening cycle, the controller being programmed to control the tool's rotational speed to be $[(\tau_F-\tau_C)/t]/r$ during at least a portion of the fastening cycle,
   wherein t comprises a time constant of speed control,
   wherein $\tau_F$ comprises a target final torque for the fastening cycle, and
   wherein r comprises a torque rate,
   the method comprising:
   running the torque applying tool during the fastening cycle;
   sensing the instantaneous torque ($\tau_C$) being applied by the torque applying tool; and
   responsively controlling the rotational speed of the tool so as to be $[(\tau_F-\tau_C)/t]/r$ during at least the portion of the fastening cycle.

2. The method of claim 1, wherein said method comprises repeating said sensing and said controlling at a predetermined frequency.

3. The method of claim 2, wherein the predetermined frequency comprises at least 100 Hz.

4. The method of claim 1, further comprising controlling the rotational speed of the tool to be a rated speed of the torque applying tool when $[(\tau_F-\tau_C)/t]/r$ is greater than the rated speed.

5. The method of claim 1, further comprising controlling the rotational speed of the tool to be a predetermined minimum speed ($\omega_{min}$) when $\omega_{min}>[(\tau_F-\tau_C)/t]/r>0$.

6. The method of claim 1, further comprising controlling the rotational speed of the tool to be:
   $\omega_{max}$ if $(\tau/t)/r>\omega_{max}$;
   $(\tau/t)/r$ if $\omega_{max}>(\tau/t)/r>\omega_{min}$;
   $\omega_{min}$ if $\omega_{min}>(\tau/t)/r>0$; and
   0 if $(\tau/t)/r\leq 0$,
   wherein $\tau=\tau_F-\tau_C$,
   $\omega_{max}$ is a rated speed of the tool,
   wherein $\omega_{min}$ is a predetermined minimum speed for the tool.

7. The method of claim 1, further comprising:
   sensing a rotational angle of the spindle; and
   calculating the torque rate (r) during the fastening cycle as a ratio of change to the sensed torque per change to the sensed rotational angle.

8. The method of claim 1, wherein the time constant of speed control (t) comprises a constant that was obtained before the fastening cycle.

9. A combination comprising:
   a torque applying tool having a motor and rotating output spindle;
   a torque sensor that measures an instantaneous torque ($\tau_C$) exerted by the output spindle during a fastening cycle; and
   a controller operatively connected to the torque sensor and tool to control the tool's rotational speed during the fastening cycle, the controller being programmed to control the tool's rotational speed to be $[(\tau_F-\tau_C)/t]/r$ during at least a portion of the fastening cycle,
   wherein t comprises a time constant of speed control,
   wherein $\tau_F$ comprises a target final torque for the fastening cycle, and
   wherein r comprises a torque rate.

10. The combination of claim 9, wherein the controller is programmed to adjust the speed of the tool at a predetermined frequency.

11. The combination of claim 10, wherein the predetermined frequency is at least 100 Hz.

12. The combination of claim 9, wherein the controller is programmed to control the rotational speed of the tool to be a rated speed of the torque applying tool when $[(\tau_F-\tau_C)/t]/r$ is greater than the rated speed.

13. The combination of claim 9, wherein the controller is programmed to control the rotational speed of the tool to be a predetermined minimum speed ($\omega_{min}$) when $\omega_{min}>[(\tau_F-\tau_C)/t]/r>0$.

14. The combination of claim 9, further comprising:
   a rotational angle sensor configured to sense a rotational angle of the spindle,
   wherein the controller is programmed to calculate the torque rate (r) during the fastening cycle as a ratio of change to the sensed torque per change to the sensed rotational angle.

15. The combination of claim 14, wherein the controller is programmed to adjust the speed of the tool at a predetermined frequency, the adjusting being based on changes to the calculated torque rate during the fastening cycle.

16. The combination of claim 9, wherein the controller is programmed to use as the time constant of speed control a constant that was known by the controller prior to the fastening cycle.

17. A controller for a torque applying tool having a motor and a rotating output spindle, wherein:
   the controller is configured to operatively connect to the tool and to a torque sensor that measures an instantaneous torque ($\tau_C$) exerted by the output spindle during a fastening cycle;
   the controller is configured to control the tool's rotational speed during the fastening cycle;
   the controller is programmed to control the tool's rotational speed to be $[(\tau_F-\tau_C)/t]/r$;
   t comprises a time constant of speed control;
   $\tau_F$ comprises a target final torque for the fastening cycle; and
   r comprises a torque rate.

* * * * *